Feb. 24, 1959   A. W. FABER ET AL   2,874,507
TELESCOPING FISHING ROD
Filed Sept. 27, 1955   2 Sheets-Sheet 1
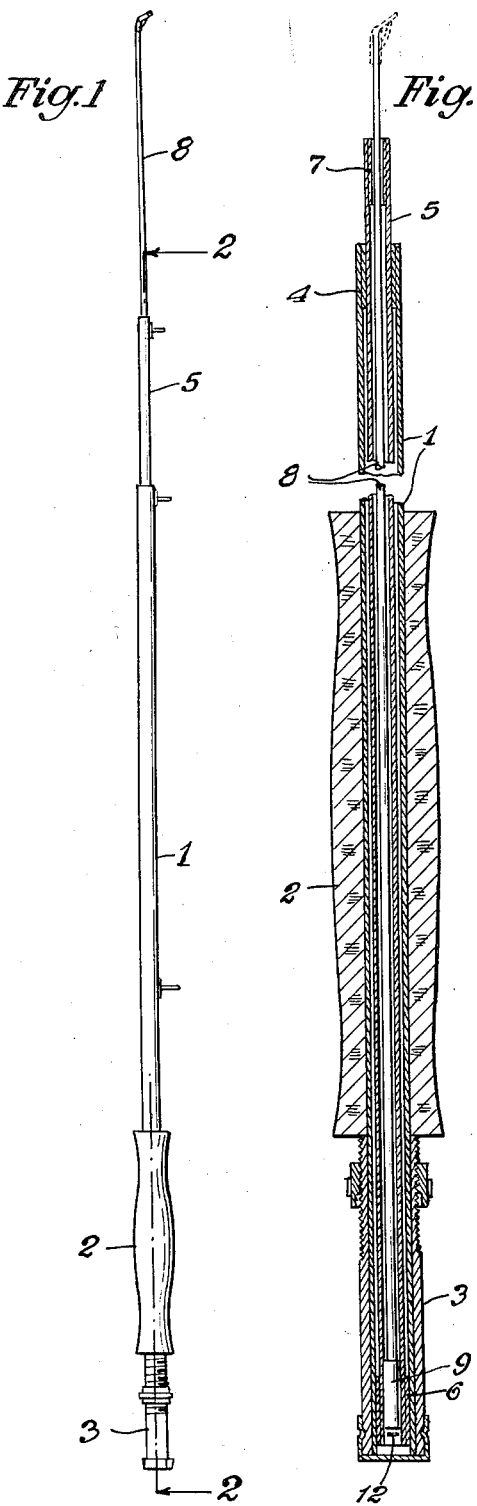
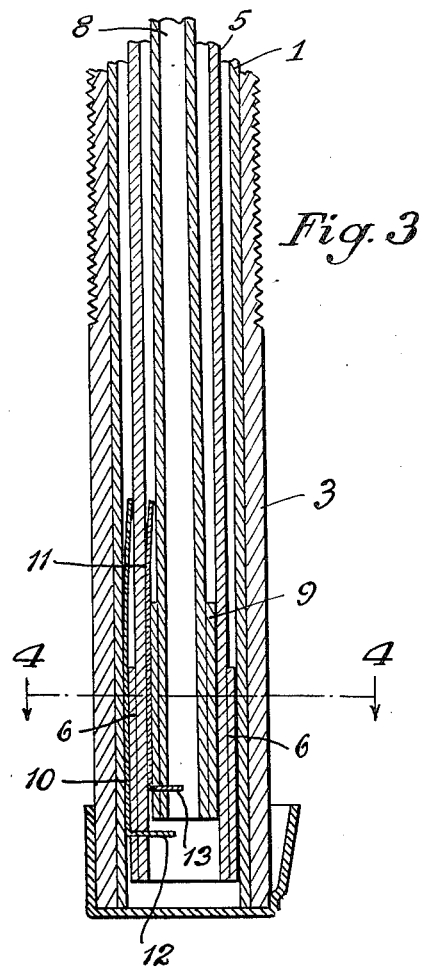
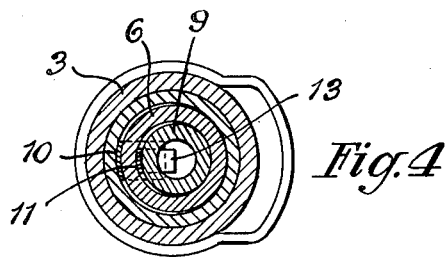
Inventors
Aloysius W. Faber
Arthur E. Gronewold
by Parker & Carter
Attorneys

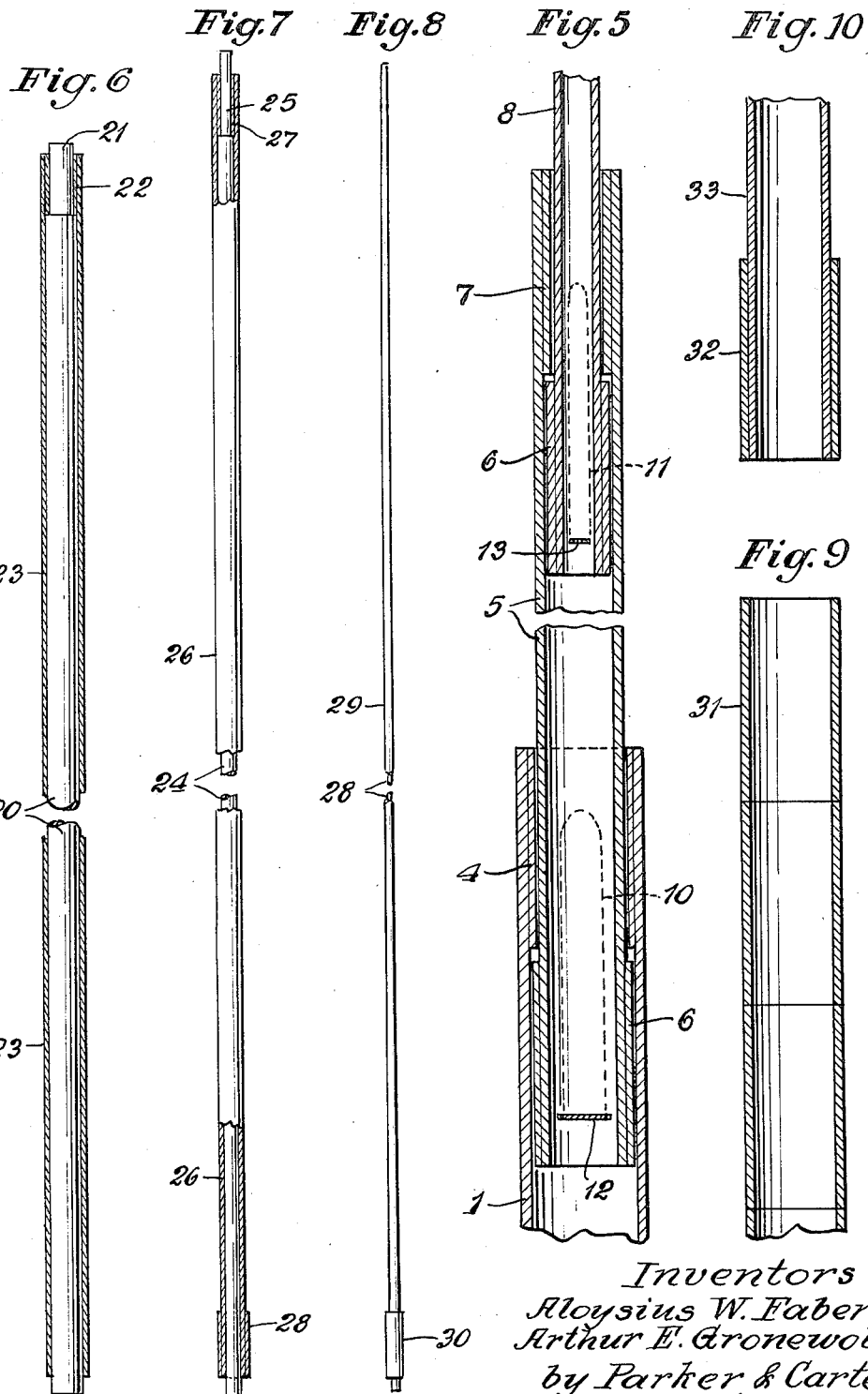

United States Patent Office 2,874,507
Patented Feb. 24, 1959

2,874,507

TELESCOPING FISHING ROD

Aloysius W. Faber and Arthur E. Gronewold, Chicago, Ill., assignors to Richardson Rod & Reel Company, Chicago, Ill., a corporation of Illinois Application September 27, 1955, Serial No. 536,992

1 Claim. (Cl. 43—18)

Our invention relates to telescoping fishing rods and methods of manufacture and has for one object to provide a light, strong, flexible fishing rod made up of a plurality of telescoping sections or joints so arranged that the fisherman may while fishing, change the effective length of the rod.

Another object is to provide a telescoping rod which includes positive means for limiting the maximum extension of each joint, while at the same time, a joint only partially extended will be held in selected position by the user without interfering with the feel of the rod.

Another object is to provide a rod made up of a plastic material such as fiberglass cloth.

Another object is to provide a new and improved method of manufacture of the telescoping joints.

Other objects will appear from time to time throughout the specification and claim.

The invention is illustrated more or less diagrammatically in the accompanying drawings, wherein—

Figure 1 is a side elevation of a rod embodying the invention in partially extended position;

Figure 2 is a section through the rod on a somewhat larger scale in a retracted position along the line 2—2 of Figure 1;

Figure 3 is a section in a plane at right angles to the plane of Figure 2 through the butt section on an enlarged scale;

Figure 4 is a section along the line 4—4 of Figure 3;

Figure 5 is a longitudinal section through the rod on an enlarged scale;

Figure 6 is a side elevation view of a forming mandrel showing the butt joint in section thereabout;

Figure 7 is a side elevation view of the forming mandrel for the second joint joining the second joint part in elevation and part in section thereabout;

Figure 8 is a side elevation of the tip joint;

Figure 9 is a detail of a sleeve for use with one of the sections;

Figure 10 is a section through the sleeve with the rod section with a reinforcing or stop section formed around it.

Like parts are indicated by like characters throughout the specification and drawings.

The rod comprises a tubular butt section 1 of uniform outer diameter. 2 is a handle threaded on the butt section abutting against a reel seat 3. The details of the handle and the reel seat form no part of the present invention.

The butt section being tubular, is of uniform internal diameter throughout its length except at the outer end where a rigidly mounted sleeve 4, of uniform inner diameter is located. Reference numeral 5 identifies the second joint. It also is tubular. The inner and outer diameters of the tube being continuous throughout except that at the inner end, the second joint carries an enlargement 6, the outer diameter of which makes a smooth running fit with the inner diameter of the butt joint and at its outer end it carries a sleeve 7 rigidly mounted therein, the inner diameter of which is less than the inner diameter of the remainder of the joint. 8 is the tip joint. Unlike the other two joints, while it may or may not be tubular as the case may be, it depresses from end to end and terminates at its inboard end in an enlarged portion 9, the outer diameter of which makes a smooth running fit with the interior of the second joint 5.

In the retracted position such as shown especially well in Figures 2 and 3, the second joint is held in alignment with the butt section by contact at 4 and 6 and such alignment is retained no matter what the extent of the second joint but the tip joint, while at its inboard end it is held in alignment by contact 9, the slender reduced end of the tip joint is free to move, being limited in its movement by contact with the sleeve 7.

When the tip joint is drawn out to its full extent, members 4 and 9 abut and the clearance between the outer periphery of the tip and the inner wall of the sleeve 4 is negligible. When the second joint is drawn out to its full excursion as shown in Figure 5, the members 4 and 6 abut and limit further extension.

Springs 10 and 11 carried respectively by the enlarged ends of the second joint and the tip joint penetrating through the walls thereof as indicated at 12 and 13 and extending forwardly beyond the forward extension of the members 6 and 9. These springs provide a frictional resistance to longitudinal movement of the joint but where the springs are bent inwardly, they are free to penetrate respectively into the reduced portions 4 and 7 to provide an additional friction lock to hold the joints in their extended position.

Figures 6 to 10 inclusive disclose the method of manufacturing. 20 is a cylindrical mandrel. It is reduced at one end as at 21. The first step is to wind around that reduced end a strip of the plastic material as indicated at 22, then a sheet of the plastic material as at 23 is wound about the mandrel and the winding 22, the winding 22 having approximately the same outside diameter as the mandrel. Then the assembly is cured by heat, welding the successive layers of the fabric together and welding the sleeve 22 to the inner wall of the sleeve 23 and this with the reduced inner diameter end section is withdrawn from the mandrel and forms the butt section.

The second joint section is formed over a smaller mandrel 24, reduced at one end as at 25. A sleeve 26 is formed after the fabric has been wound at 27 around the reduced portion 25 by winding the fabric about the entire mandrel. Thereafter a strip of the fabric is wound about the opposite end of the butt section as at 28. The whole assembly is cured and then withdrawn from the mandrel 24, thus forming the second joint section 5.

The tip section is formed by wrapping the fabric about a tapered mandrel shown at 28 to form a tapered section 29. A strip of fabric is wrapped around the tapered section as at 30. This is then withdrawn from the tapered mandrel and forms the tip section.

A modification of the method above indicated is illustrated in Figures 9 and 10. A sleeve 31 is formed by winding the plastic fabric around the mandrel, the mandrel being later withdrawn. The sleeve is cut into sections as indicated. A section 32 can be fitted onto the tubular section 33 and cemented or otherwise fastened in place. If a larger tube is involved or a smaller sleeve, the sleeve can be fitted into the tube. In either case, the rod section can be provided with an increased sleeve at one end and a decreased sleeve inside the other end just as shown even more clearly perhaps in Figure 5.

We claim:

A fishing rod comprising a plurality of cylindrical hollow tubular sections telescopically slidable one within the other, means for maintaining them in generally concentric alignment including inner and outer sleeves adjacent the ends thereof, means for frictionally resisting relative longitudinal movement of the sections including a spring finger at the inboard end of an inner section, extending forwardly along the outer sleeve and biased to contact with the external wall of the section forward of the sleeve and the internal wall of the outer section, the finger being adapted to wedge between the inner section and the said outer sleeve when the inner section is moved to its extended position, each finger having at its rearward end an element penetrating the sleeve and section wall to extend across the hollow interior of the section to limit inward movement of a section telescoping therein.

References Cited in the file of this patent

UNITED STATES PATENTS

| | | |
|---|---|---|
| 1,336,088 | Poremba | Apr. 6, 1920 |
| 1,428,382 | Marquette | Sept. 5, 1922 |
| 1,643,003 | Chromczak | Sept. 20, 1927 |
| 2,262,636 | Cuno | Nov. 11, 1941 |
| 2,276,524 | Taylor | Mar. 17, 1942 |
| 2,541,609 | Pullan | Feb. 13, 1951 |
| 2,749,643 | Scott | June 12, 1956 |

FOREIGN PATENTS

| | | |
|---|---|---|
| 287,791 | Switzerland | Apr. 16, 1953 |